(12) United States Patent
Coulson et al.

(10) Patent No.: US 7,640,395 B2
(45) Date of Patent: Dec. 29, 2009

(54) MAINTAINING WRITE ORDERING IN A SYSTEM

(75) Inventors: Richard L. Coulson, Portland, OR (US); Sanjeev N. Trika, Hillsboro, OR (US); Jeanna N. Matthews, Massena, NY (US); Robert W. Faber, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 11/394,364

(22) Filed: Mar. 30, 2006

(65) Prior Publication Data

US 2007/0233947 A1 Oct. 4, 2007

(51) Int. Cl.
*G06F 12/00* (2006.01)
(52) U.S. Cl. ........................ 711/113; 711/135; 711/206
(58) Field of Classification Search ................. 711/113, 711/115, 143
See application file for complete search history.

(56) References Cited

U.S. PATENT DOCUMENTS

| | | | | |
|---|---|---|---|---|
| 5,557,739 A | * | 9/1996 | Gupta et al. .................. 714/34 |
| 5,590,300 A | * | 12/1996 | Lautzenheiser ............. 711/202 |
| 5,611,071 A | * | 3/1997 | Martinez, Jr. ................ 711/133 |
| 5,715,424 A | * | 2/1998 | Jesionowski et al. . 711/E12.019 |
| 5,787,461 A | * | 7/1998 | Stephens ..................... 711/113 |
| 5,819,100 A | * | 10/1998 | Pearce ........................ 713/323 |
| 6,353,834 B1 | * | 3/2002 | Wong et al. .................. 707/202 |
| 2001/0029570 A1 | * | 10/2001 | Yamamoto et al. ........... 711/113 |
| 2001/0042170 A1 | * | 11/2001 | Belknap et al. .............. 711/118 |
| 2001/0048659 A1 | * | 12/2001 | Weirauch et al. .......... 369/275.3 |
| 2002/0156972 A1 | * | 10/2002 | McKnight et al. ........... 711/118 |
| 2003/0182390 A1 | * | 9/2003 | Alam .......................... 709/216 |
| 2005/0125606 A1 | | 6/2005 | Garney ....................... 711/113 |
| 2005/0138282 A1 | | 6/2005 | Garney et al. ................ 711/113 |
| 2005/0193230 A1 | * | 9/2005 | Springer et al. ................. 714/5 |
| 2005/0210218 A1 | * | 9/2005 | Hoogterp .................... 711/203 |

OTHER PUBLICATIONS

U.S. Appl. No. 11/266,119, filed Nov. 3, 2005, entitled "Recovering From a Non-Volatile Memory Failure" by Richard L. Coulson et al.
U.S. Appl. No. 11/254,508, filed Oct. 20, 2005, entitled "A Method to Enable Fast Disk Caching and Efficient Operations on Solid State Disks" by Sanjeev N. Trika et al.
U.S. Appl. No. 11/317,779, filed Dec. 23, 2005, entitled "Cache Disassociation Detection" by Knut S. Grimsrud.
U.S. Appl. No. 11/172,081, filed Jun. 29, 2005, entitled "A Method, Device, and System to Avoid Flushing the Contents of a Cache by Not Inserting Data From Large Requests" by Jeanna N. Matthews.
U.S. Appl. No. 11/172,608, filed Jun. 30, 2005, entitled "Technique to Write to a Non-Volatile Memory" by Sanjeev N. Trika et al.

* cited by examiner

*Primary Examiner*—Matt Kim
*Assistant Examiner*—Michael C Krofcheck
(74) *Attorney, Agent, or Firm*—Trop, Pruner & Hu, P.C.

(57) ABSTRACT

In one embodiment, the present invention includes a method for maintaining a sequence of writes into a disk cache, where the writes correspond to disk write requests stored in the disk cache, and ordering cache writes from the disk cache to a disk drive according to the sequence of writes. In this way, write ordering from an operating system to a disk subsystem is maintained. Other embodiments are described and claimed.

10 Claims, 4 Drawing Sheets

MAINTAINING WRITE ORDERING IN A SYSTEM

BACKGROUND

Disk input/output (I/O) is one of the biggest bottlenecks on a computer platform. Disk caching of disk drive data in a cache memory offers significantly improved performance, while reducing power consumption of the system, as the associated drive can be kept spun down for longer periods of times. In a writeback cache system write data is written into the cache on operating system (OS) request, and at some later time, the dirty data is written to the disk drive as a so-called lazy write.

Such a disk cache may be maintained physically separate from an associated disk drive such as a hard drive. As an example, the disk cache may be a non-volatile memory coupled to a system motherboard, while the disk drive is a separate physical enclosure, typically connected to the motherboard via a connector and cabling. However, a problem with this approach is that the associated disk drive cannot be removed from the system and used on another system unless the cache is first flushed. Also, such a drive may have a mix of old and new data, and is thus scrambled and unusable on a second system.

Further, if the drive is used on the second system and its data is modified, and then the drive is returned to the original system, the cache then contains stale data and may provide wrong data to the OS responsive to read requests. Such separation scenarios commonly occur, as when a user's system crashes and has hard errors an information technology (IT) person may remove the disk drive from the original system and move it to a different system (e.g., a loaner system) for the user. The user works on the loaner system (thereby modifying data on the disk drive) while the original system is repaired. The drive is later returned to the original system containing the cache. However, the data in the disk cache and disk drive are incoherent, and thus errors are likely to occur.

DETAILED DESCRIPTION

Figure 1:
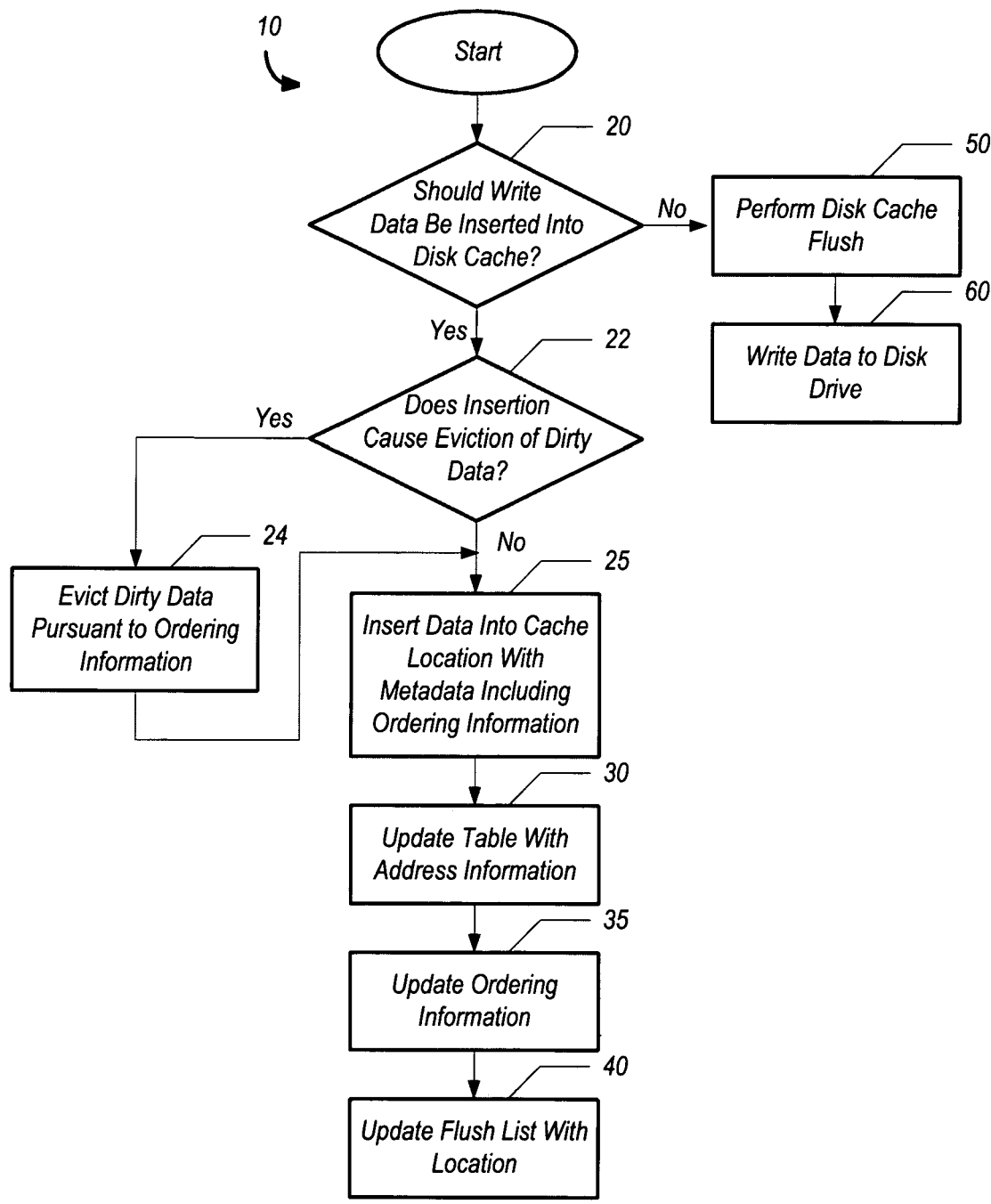
FIG. 1 is a flow diagram of a method in accordance with one embodiment of the present invention.

In various embodiments, the state of a disk drive or other mass storage may be maintained coherently with a cache such as a disk cache. The drive and/or cache can thus be moved to another system and is usable there. Furthermore, embodiments of the present invention allow the drive to be returned to the original system without compromising data integrity. As will be discussed further below, in some embodiments the cache memory may be a platform-based memory. That is, the memory may be associated with a platform (e.g., affixed to a motherboard).

To maintain coherency, each write operation to the disk from the disk cache may be performed in the same order as that issued by an operating system (OS) to a disk subsystem (i.e., disk cache and disk drive). Thus on each write issued by the OS that is inserted into the cache, a sequence number may be maintained specifying the order of the writes. Thus, when an OS issues a write to a disk sector X that is chosen to be inserted into the disk cache, the data is inserted in the disk cache along with metadata that contains a globally-maintained sequence number (S). The value of the sequence number is then incremented. On a subsequent write by the OS to a disk sector Y that is selected for insertion in the cache, the data is inserted into the cache with the incremented value of S (followed by another increment to S). The value of S may be maintained in a volatile memory (e.g., a dynamic random access memory (DRAM)), and may be saved on shutdown for continuation on the next reboot (and in case of power-failures/crashes, S may be recovered as part of a crash recovery algorithm). Note that a sequence number in accordance with an embodiment of the present invention may be used for other purposes such as for efficient non-volatile memory write operations (e.g., to reduce latencies).

In the case of a write to a disk sector that already exists in the cache, the existing cache data is not updated, rather another copy of the data is inserted with the incremented sequence number count. This ensures that if data in sector X is written followed by sector Y followed by sector X again, then writes to the drive occur in that order. For read-hit processing (i.e., to provide data from the disk cache to the OS responsive to a read request) to such updated sectors, only the most recently written data may be returned.

Later, sequence numbers may be used when flushing dirty data from the cache to the disk drive, typically at lazy times or in case of power events such as shutdowns, hibernates, suspends, or during crash/power-fail recovery. Specifically, sectors are written out from the cache to the disk drive in the order specified by the sequence numbers. If a decision is made to not insert newly written data in the cache, all previously written data that is stored in the cache must first be written out to disk. Similarly, on eviction of any dirty element from the cache, all elements written before it must first be written out to the disk.

For performance reasons, sometimes write requests issued by an OS are not inserted into the disk cache, e.g., for streaming data. In such a case, the cache may be flushed (maintaining the write order, as described above) before sending OS-issued write requests directly to the disk. In this way write ordering is maintained. Since flushing the cache at such demand times may cause low system performance, in some embodiments the cost of the non-insertion (e.g., based on how many dirty sectors are in the cache) may be evaluated, and data of the write requests may be inserted into the cache, even though it may be deemed to be streaming data, if the cost estimate is above a predetermined threshold. That is, if the amount of dirty data in the cache is greater than a given threshold, data of the current (e.g., streaming) write requests may instead be written into the disk cache.

This method of inserting, updating, evicting and flushing the dirty contents of the cache ensures that the drive may at worst be some number of write accesses behind the data in the disk cache, but is never in a state in which out-of-order data is written to it that essentially scrambles the drive and makes the contents unusable. Accordingly, the coherent but possibly somewhat stale drive may be moved to alternate systems and used as needed. The drive data may potentially be stale (and thus a user may lose a last portion of data written to the drive by the OS), but the data is never corrupt/scrambled. Accordingly, a disk cache in accordance with an embodiment of the present invention may be consistent with disk drive lazy write policies: if power fails, there may be a small amount of user data rollback (e.g., several minutes of lost data).

If a drive is migrated to a second system (e.g., pursuant to a hard error on a first system, a user upgrade or the like) the data in the drive may be stale, and a user may lose some amounts of recent data. To prevent such data loss, in various embodiments the drive may be guaranteed to be no more than, e.g., a certain time (t) in seconds stale. This guarantee may be realized by flushing the cache at a predetermined interval (e.g., every t seconds). A variety of methods can be used to set this threshold (including providing control to a user).

Accordingly, by using embodiments of the present invention a drive can be migrated to a second system and used, ensuring drive coherency and no more than a small amount of loss of user data from the first system (e.g., after a system failure). However, after use on the second system, if the drive is brought back to the original system, a drive signature will match what is in the cache, and the cache will satisfy read hits from stale data in the cache (in embodiments in which the disk cache is a non-volatile memory). To prevent such stale data, use on the second system may be detected in various manners. For example, a number of disk drive spin-ups may be obtained from the drive and compared to a number of spin-ups recorded in the original system (e.g., in the disk cache). If the numbers do not match, this is an indication that the data in the disk cache is not coherent, and thus the data in the cache may be invalidated to avoid data corruption. Or another count, such as a power-cycle count of the disk drive may be checked to test for disk separation.

Referring now to FIG. 1, shown is a flow diagram of a method in accordance with one embodiment of the present invention. As shown in FIG. 1, method 10 may be used to handle incoming write requests from an OS and route them accordingly. In various implementations, method 10 may be performed by a controller within a disk cache although the scope of the present invention is not limited in this regard.

As shown in FIG. 1, method 10 may begin by determining whether write data should be inserted into the disk cache (diamond 20). This determination may be based on various criteria, in different embodiments. For example, the criteria may include the size of the write (i.e., whether it is part of a streaming data access), an available amount of space in the disk cache, or other such criteria. If it is determined that the data should be inserted into the disk cache, control passes to diamond 22, where it may be determined whether the insertion causes eviction of dirty data. If so, control passes to block 24. There, data may be evicted pursuant to ordering information (block 24). That is, ordering information may be used to indicate a write order in which the write requests for the data being evicted was received. As will be described further below, in one embodiment, such ordering information may be part of a flush list. From either of diamond 22 or block 24, control passes to block 25. There, the write data is written into a selected cache location along with metadata (block 25). This metadata may include the ordering information that indicates a write order in which the write request for the data was received. As one example, the ordering information may correspond to a sequence number stored with the metadata of the write request. This metadata may further include other identifying information, such as address information including a logical block address (LBA) provided by the OS, indicator information to indicate the cacheline to which the data it is written, a valid or dirty indicator, and other such data.

Still referring to FIG. 1, next a table such as a hash table or other address translation table may be updated with the address information (block 30). For example, a hash table that maintains a list of LBAs of various write requests and the associated disk cache memory locations in which the data of the write requests are stored may be updated. Furthermore, ordering information may be updated (block 35). Continuing with the example of ordering information that is a sequence number, the sequence number may be incremented so that a later incoming write request is associated with an incremented number to indicate its correct write order. While described herein as a sequence number, other implementations may provide ordering information in other manners. For example, a timestamp may be associated with incoming write requests that can equally function as ordering information.

In some implementations a flush list may be maintained in the disk cache. Such a flush list may correspond to an ordering list in which write requests in the disk cache are to be flushed out to the disk drive. In these implementations, the flush list may be updated to include the memory location at which the present write request was inserted (block 40).

Accordingly, the latency associated with directly writing data to a disk drive responsive to a write request may be avoided by insertion into the disk cache. Then at a later time, e.g., at an idle time of the system, lazy writes may be effected to write back dirty data in the disk cache to the disk drive. When writing back such dirty data, the writebacks may occur in write order, i.e., in the same order in which the data was written into the disk cache. In implementations using a flush list, the location listed at the top of the flush list may be the first dirty data location to be written to the disk drive, and so forth. Note that instead of a flush list, in some embodiments ordering information alone (e.g., a sequence number) may instead be used to effect writebacks to the disk drive in the correct write order.

Still referring to FIG. 1, if instead at diamond 20 it is determined that the write data should not be inserted into the disk cache, control passes to block 50. There a disk cache flush may be performed (block 50). That is, to maintain write ordering in this situation, all dirty data in the disk cache is written out to the disk drive prior to writing the data of the current write request (i.e., of diamond 20). This flush may be performed in the order in which data was written into the disk cache by the OS. After completion of such flushing, the data of the current write request may be written to the disk drive (block 60). While described with this particular implementation in the embodiment of FIG. 1, it is to be understood that the scope of the present invention is not so limited and other manners of maintaining write ordering of write requests handled by a disk cache may be realized.

Figure 2:
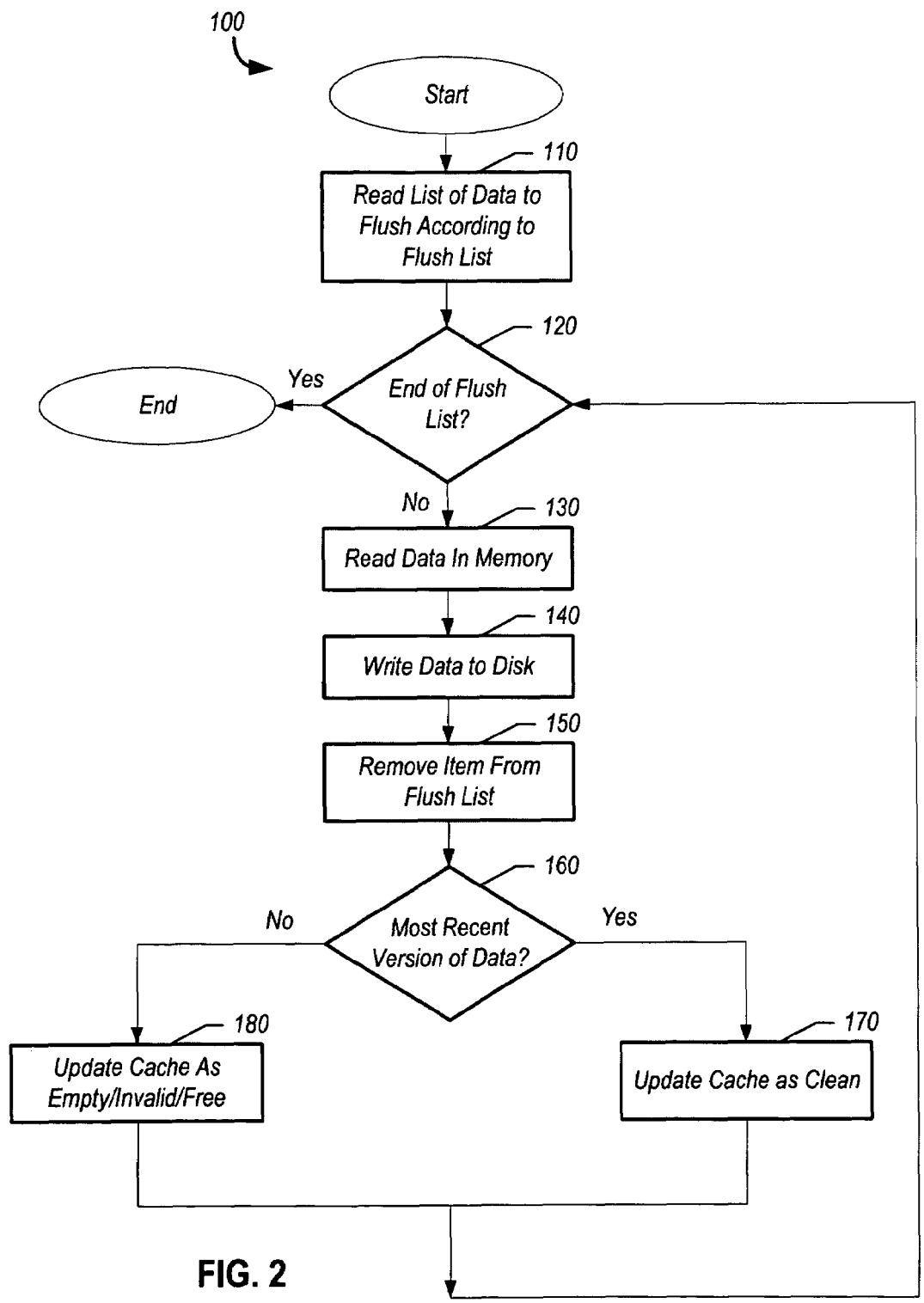
FIG. 2 is a flow diagram of a method of flushing data in accordance with an embodiment of the present invention.

Referring now to FIG. 2, shown is a flow diagram of a method of flushing data in accordance with an embodiment of the present invention, which also may be performed using a controller of a disk cache. As shown in FIG. 2, method 100 may begin by reading a list of data to be flushed according to a flush list (block 110). Specifically, to maintain write ordering, the entry at the top of the flush list (i.e., corresponding to the oldest dirty data in the disk cache) is selected for write back to the disk drive. Next, it may be determined whether the end of the flush list has been reached (diamond 120). If so, method 100 may conclude. If not, control passes to block 130, where data in the next memory location to be flushed is read (block 130). Thus the data is then written to the disk drive (block 140). More specifically, the data may be written to the LBA set forth in metadata read with the data in block 130. Next, the flush list may be updated accordingly (block 150). For example, the entry in the flush list for this write request written to disk in block 140 may be removed.

Next, the cacheline in the disk cache corresponding to the write request written out to disk may be updated appropriately. The manner of updating the cacheline may depend on the state of the information written to disk. Accordingly, control passes to diamond 160. There, it may be determined whether the cacheline written to disk was the most recent version of the data stored into the disk cache (diamond 160). If so, control passes to block 170, where the cacheline may be updated as being clean (block 170). Otherwise, the cacheline may be updated as being empty/invalid/free (diamond 180). From either of blocks 170 and 180, control passes back to diamond 120, discussed above.

Note that to perform power-failure recovery, a cache flush may be performed. In that case, a flush list may first be reconstructed with a scan of all valid metadata entries in the cache, and sorting those entries by sequence number. That is, in some embodiments the sequence number may be used to both identify write ordering and to identify the most recent version of a logical cache line if it is written to more than one physical location. Thus the same sequence number used for write ordering may also be used to correctly recover logical to physical cache line mappings.

Referring now to Table 1, shown is example pseudo-code of a method in accordance with one embodiment of the present invention. As shown in Table 1, the pseudo-code may be used to perform disk subsystem write operations responsive to a disk subsystem write request from an OS.

TABLE 1

DiskSubsystemWrite (LBA X, Data D)

Decide whether X should be inserted in the cache. // Any caching policy
                                                                           may be used for this,
                                                             // including estimation of
                                                             cost of non-insertion
If (X should be inserted in the cache) then
    // this could be an insertion, or an update. Note that in case of
    update, previous copy of
    // X's data is not removed from the cache, and it also remains
    in the list of to-be-flushed
items.
    Identify location L in the cache where X should be stored.
    Add D to the cache at location L, with metadata including valid,
    dirty, X and S information.
    Update the hashtable so that X points to L.
    Increment S
    Add L to the end of ToBeFlushed list.
Else
    CacheDirtyFlush ( )
    Write D to the cached disk at address X
End if As shown in Table 1, the write request received from the OS may take the form of a disk subsystem write request that includes a logical block address (i.e., corresponding to a disk sector number) and the data to be written thereto. As shown in Table 1, first it may be determined whether the data should be inserted into the cache or sent directly to the drive. If it is determined that the data should be stored in the cache, the data is stored at an identified location along with metadata including a sequence number of the write request from the OS. Furthermore, an address table may be updated to associate the disk's sector number with the cache location (i.e., cacheline). Then the sequence number may be incremented and the cacheline location may be added to a cache flush list. If instead it is decided that the data should not be cached, all dirty data may be flushed to disk (e.g., via a second algorithm). After flushing the dirty data, the data corresponding to the write request is written to the requested disk sector.

Referring now to Table 2, shown is pseudo-code of a cache flush method in accordance with one embodiment of the present invention.

TABLE 2

CacheFlush ( )

For each element L in the ToBeFlushed list, process in order:
    Read data D and metadata M at cache location L
    Write D to disk at LBA specified in M
    Update cache to evict the entry, or mark the element clean.
    Remove L from the ToBeFlushed list.
End for As shown in Table 2, a cache flush method may process data in a cache flush list so that data is sequentially written out to disk based on its order in the cache flush list. After reading data of a cache location and writing it out to memory, the cache location may be updated to evict the location or mark it clean. Furthermore, the entry in the flush list corresponding to that cache location may be removed. While described with this particular manner in the pseudo-code of Tables 1 and 2, it is to be understood that the scope of the present invention is not limited in this regard.

Figure 3:
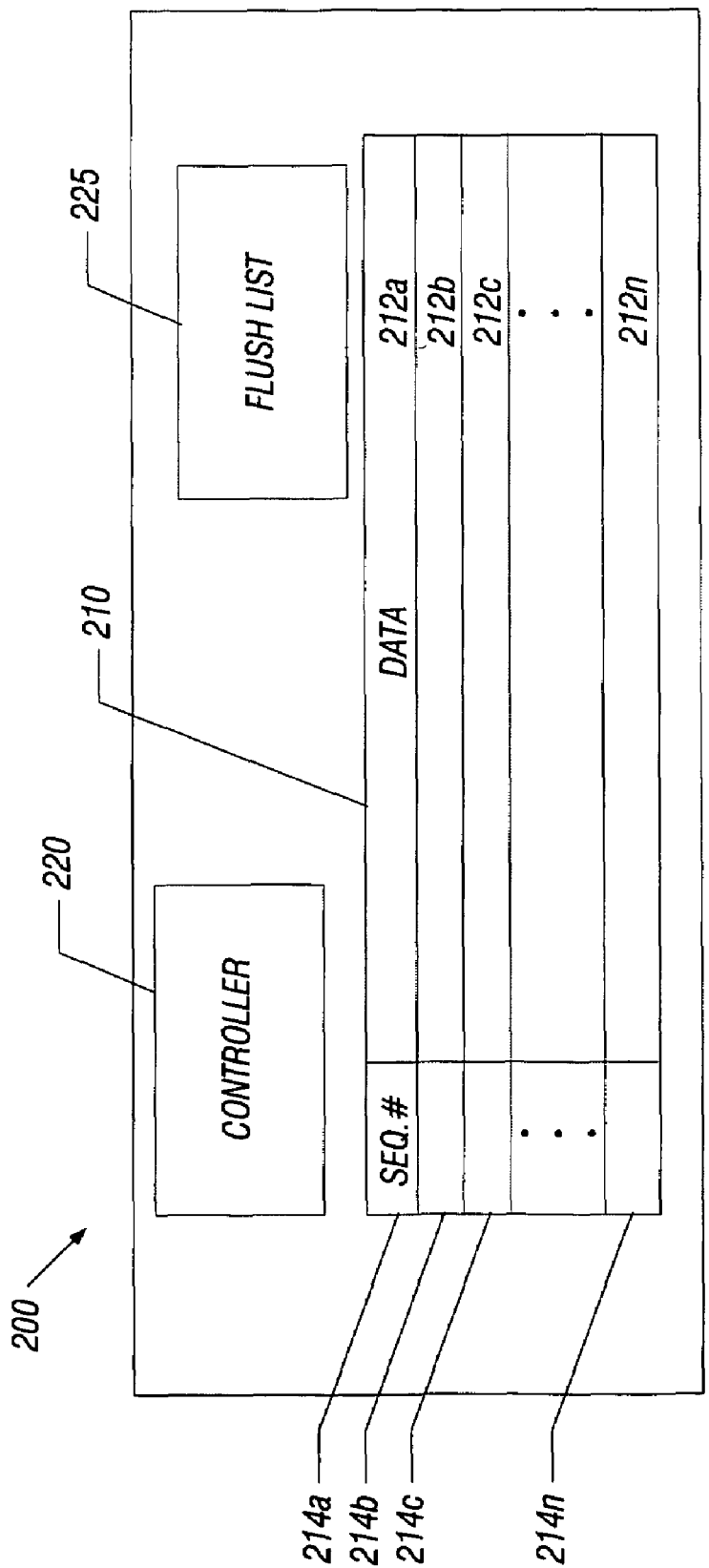
FIG. 3 is a block diagram of a non-volatile memory in accordance with one embodiment of the present invention.

Referring now to FIG. 3, shown is a block diagram of a non-volatile memory in accordance with one embodiment of the present invention. As shown in FIG. 3, non-volatile memory 200 may include a memory array 210 that includes storage for various data. Memory array 210 may be a non-volatile memory that includes storage for various entries. Specifically, as shown in FIG. 3, memory array 210 includes a plurality of entries each including data 212a-212n (generically, data 212) and an associated sequence number 214a-214n (generically, sequence number 214). When data 212 is stored in memory array 210, its associated sequence number 214 may be written by a controller 220, which may be used to perform embodiments of the present invention.

As further shown in FIG. 3, non-volatile memory 200 may further include a flush list 225, which may include entries in a list form, with each entry corresponding to a disk write request received from an OS. Thus, flush list 225 may be maintained in a first-in-first-out manner such that the top of flush list 225 corresponds to the oldest-in-time write request in memory array 210. While shown as a separate component 225, it is to be understood that in various embodiments, flush list 225 may be part of memory array 210. Furthermore, in some embodiments a separate flush list may not be present and instead sequence numbers 214 may be used to control write ordering in accordance with an embodiment of the present invention.

In various embodiments, controller 220 may be used to write and read sequence numbers 214 and flush list 225 and to ensure write backs from non-volatile memory 200 to a disk drive maintain write ordering. Furthermore, controller 220 may be used to implement various activities, such as resetting memory array 210 when an associated disk drive is returned to a system after usage outside of the system, to avoid data corruption issues. Of course, controller 220 may perform other activities with respect to non-volatile memory 200. Furthermore, while described as a controller, it is to be understood that a controller may take the form of various hardware, software (such as a driver), firmware or combinations thereof, in different embodiments.

Figure 4:
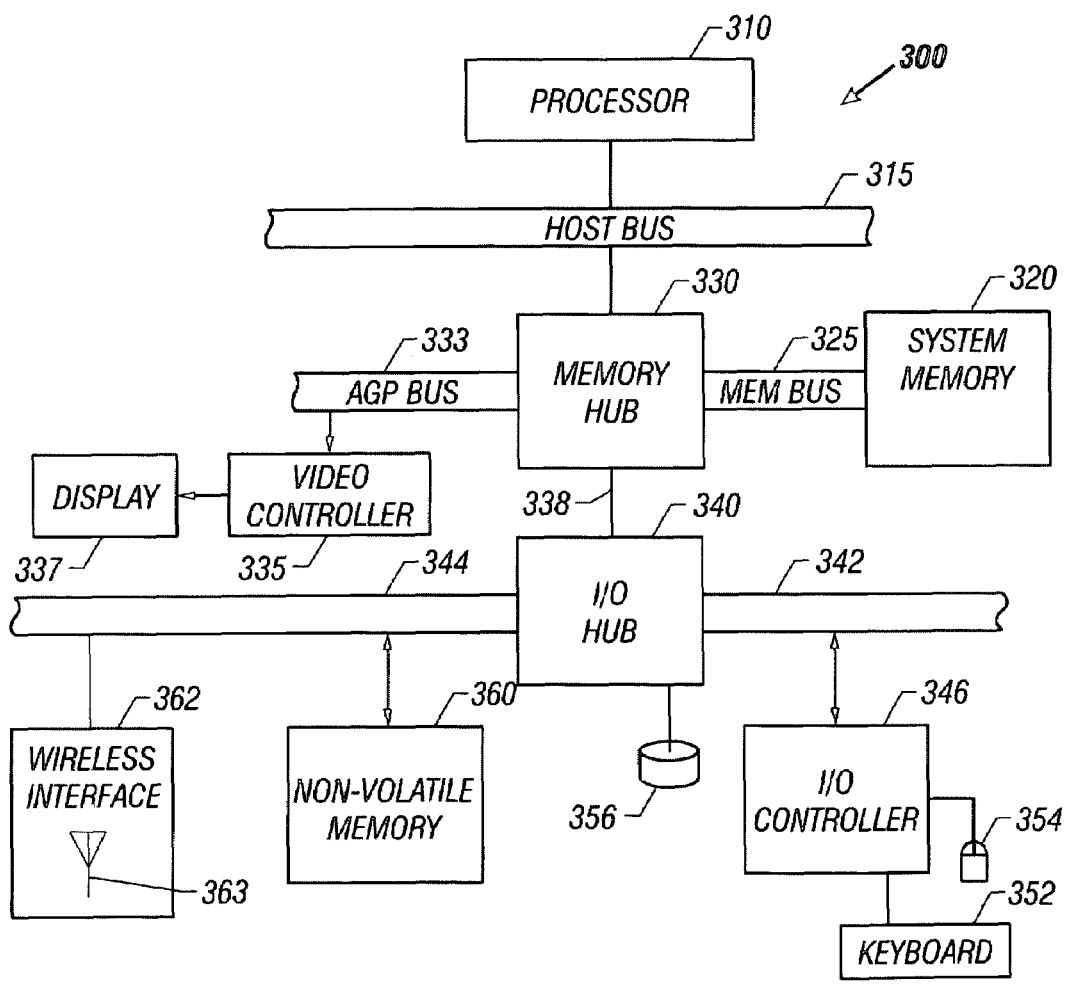
FIG. 4 is a block diagram of a system with which embodiments of the invention may be used.

FIG. 4 is a block diagram of a system with which embodiments of the invention may be used. System 300 includes a processor 310, which may be a general-purpose or special-purpose processor. Processor 310 may be realized as a microprocessor, microcontroller, an application-specific integrated circuit (ASIC), a programmable gate array (PGA), and the like. As used herein, the term "system" may be any type of processor-based system, such as a mainframe computer, a desktop computer, a server computer, a laptop computer, a portable device, an appliance, a set-top box, or the like.

In one embodiment, processor 310 may be coupled over a host bus 315 to a memory hub 330, which, in turn, may be coupled to a system memory 320, which may be a dynamic random access memory (DRAM) in one embodiment, via a memory bus 325. Memory hub 330 may also be coupled over an Advanced Graphics Port (AGP) bus 333 to a video controller 335, which may be coupled to a display 337. AGP bus 333 may conform to the Accelerated Graphics Port Interface Specification, Revision 2.0, published May 4, 1998, by Intel Corporation, Santa Clara, Calif.

Memory hub 330 may also be coupled (via a hub link 338) to an input/output (I/O) hub 340 that is coupled to a first bus 342 and to a second bus 344. First bus 342 may be coupled to an I/O controller 346 that controls access to one or more I/O devices. As shown in FIG. 3, these devices may include in one embodiment input devices, such as a keyboard 352 and a mouse 354. I/O hub 340 may also be coupled to, for example, a hard disk drive 356. It is to be understood that other storage media may also be included in system 300.

Second bus 344 may also be coupled to various components including, for example, a non-volatile memory 360 that in some embodiments may be a disk cache for disk drive 356. In other embodiments, non-volatile memory 360 may be an extended virtual memory with respect to system memory 320. In other embodiments, non-volatile memory 360 may act as a solid-state disk to store data (and may take the place of disk drive 356, in some embodiments). Of course, additional devices may be coupled to first bus 342 and to second bus 344.

For example, shown in FIG. 4 is a wireless interface 362 coupled to second bus 344. Wireless interface 362 may be used in certain embodiments to communicate with remote devices. As shown in FIG. 4, wireless interface 362 may include a dipole or other antenna 363 (along with other components not shown in FIG. 4). Although the description makes reference to specific components of system 300, it is contemplated that numerous modifications and variations of the described and illustrated embodiments may be possible.

Embodiments may be implemented in code and may be stored on a machine-accessible medium such as a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   storing a sequence of writes into a disk cache, including storing a sequence number corresponding to each write of the sequence of writes in the disk cache with metadata associated with the write, wherein a current value of the sequence number is stored in volatile memory and is saved on shutdown of a system for continuation on a next reboot of the system; ordering writes from the disk cache to a disk drive associated with the disk cache according to an order of the sequence of writes maintained in the disk cache;
   receiving a request to write directly to the disk drive without caching, and instead writing the data to the disk cache and not the disk drive;
   flushing the cache to the disk drive before permitting the direct write to the disk drive;
   determining whether the disk drive has been used in a system not including the disk cache, the determining including obtaining a count of spin-ups associated with the disk drive and comparing the count to a second count of spin-ups of the disk drive stored in the disk cache: and
   resetting the disk cache if the determination indicates the disk drive usage in the system not including the cache.

2. The method of claim 1, further comprising:
   determining whether to insert data of a disk write request into the disk cache; and
   flushing dirty data from the disk cache to the disk drive if the data of the disk write request is not to be inserted into the disk cache.

3. The method of claim 1, further comprising flushing dirty data from the disk cache to the disk drive at a predetermined time interval.

4. The method of claim 1, further comprising writing streaming data into the disk cache based on a cost of flushing dirty data in the disk cache.

5. An apparatus comprising:
   a non-volatile memory to store data of write requests, the data in the non-volatile memory to be written to a disk drive in a write order corresponding to storage of the write requests in the non-volatile memory, the non-volatile memory to store a sequence number associated with each write request to indicate an order in which the write requests are to be written to the disk drive from the non-volatile memory and metadata associated with the write request, wherein a current value of the sequence number is stored in volatile memory and is saved on shutdown for continuation on a next reboot of the apparatus; and
   a controller to flush dirty data in the non-volatile memory to the disk drive before direct transfer of data from an operating system to the disk drive without caching is permitted, update a translation table with address information of a write request, the translation table maintaining a list of logical block addresses of write requests and associated non-volatile memory locations in which data of the write requests are stored, update the sequence number, and update a flush list to include the non-volatile memory location at which the data of the write request was stored, wherein the disk drive is separable from a first system including the non-volatile memory and usable in a second system and the controller is to reset the non-volatile memory if the disk drive is used in the second system and returned to the first system.

6. The apparatus of claim 5, wherein the controller is to flush dirty data in the non-volatile memory to the disk drive at a fixed interval.

7. The apparatus of claim 5, wherein the non-volatile memory comprises a memory array that is to include a plurality of entries each to store data of a write request and a corresponding sequence number.

8. The apparatus of claim 7, wherein the controller is to recover logical to physical mapping of data based on the sequence number.

9. The apparatus of claim 5, said controller to, in response to a request for a write to the disk drive instead of to the non-volatile memory, write the data to the non-volatile memory instead of the disk drive.

10. The apparatus of claim 9, wherein the controller is to write the data to the non-volatile memory instead of the disk drive if a cost estimate is above a threshold.

* * * * *